(12) United States Patent
Abdallah et al.

(10) Patent No.: US 9,436,476 B2
(45) Date of Patent: Sep. 6, 2016

(54) METHOD AND APPARATUS FOR SORTING ELEMENTS IN HARDWARE STRUCTURES

(71) Applicant: Soft Machines, Inc., Santa Clara, CA (US)

(72) Inventors: Mohammad A. Abdallah, San Jose, CA (US); Mandeep Singh, Newark, CA (US)

(73) Assignee: SOFT MACHINES INC., Santa Clara, CA (US)

( * ) Notice: Subject to any disclaimer, the term of this patent is extended or adjusted under 35 U.S.C. 154(b) by 257 days.

(21) Appl. No.: 14/052,571

(22) Filed: Oct. 11, 2013

(65) Prior Publication Data

US 2014/0281422 A1 Sep. 18, 2014

Related U.S. Application Data

(60) Provisional application No. 61/793,752, filed on Mar. 15, 2013.

(51) Int. Cl.
*G06F 9/30* (2006.01)
*G06F 9/40* (2006.01)
*G06F 9/38* (2006.01)

(52) U.S. Cl.
CPC .......... *G06F 9/3834* (2013.01); *G06F 9/3855* (2013.01); *G06F 9/3857* (2013.01)

(58) Field of Classification Search
CPC ............................ G06F 9/3802; G06F 9/4843
See application file for complete search history.

(56) References Cited

U.S. PATENT DOCUMENTS

| | | | |
|---|---|---|---|
| 5,053,952 A | 10/1991 | Koopman, Jr. et al. |
| 5,386,583 A | 1/1995 | Hendricks |
| 5,651,124 A | 7/1997 | Shen et al. |
| 5,729,766 A | 3/1998 | Cohen |
| 5,751,982 A | 5/1998 | Morley |

(Continued)

FOREIGN PATENT DOCUMENTS

| | | |
|---|---|---|
| EP | 0638183 | 2/1995 |
| TW | 200719216 | 5/2007 |

(Continued)

OTHER PUBLICATIONS

Zhou Li, Fast Interconnect Synthesis With Layer Assignment. Apr. 2008.

(Continued)

*Primary Examiner* — Hyun Nam

(57) ABSTRACT

A method for sorting elements in hardware structures is disclosed. The method comprises selecting a plurality of elements to order from an unordered input queue (UIQ) within a predetermined range in response to finding a match between at least one most significant bit of the predetermined range and corresponding bits of a respective identifier associated with each of the plurality of elements. The method further comprises presenting each of the plurality of elements to a respective multiplexer. Further the method comprises generating a select signal for an enabled multiplexer in response to finding a match between at least one least significant bit of a respective identifier associated with each of the plurality of elements and a port number of the ordered queue. Finally, the method comprises forwarding a packet associated with a selected element identifier to a matching port number of the ordered queue from the enabled multiplexer.

24 Claims, 6 Drawing Sheets

(56) References Cited

U.S. PATENT DOCUMENTS

| | | | |
|---|---|---|---|
| 5,784,638 A | 7/1998 | Goetz et al. | |
| 5,826,055 A | 10/1998 | Wang et al. | |
| 5,826,073 A | 10/1998 | Ben-Meir et al. | |
| 5,870,575 A | 2/1999 | Kahle et al. | |
| 5,870,584 A | 2/1999 | Bennett | |
| 5,905,876 A | 5/1999 | Pawlowski et al. | |
| 5,983,335 A | 11/1999 | Dwyer, III | |
| 6,049,868 A | 4/2000 | Panwar | |
| 6,052,777 A | 4/2000 | Panwar | |
| 6,061,785 A * | 5/2000 | Chiarot | G06F 9/30094 712/218 |
| 6,167,508 A | 12/2000 | Farrell et al. | |
| 6,269,439 B1 | 7/2001 | Hanaki | |
| 6,360,311 B1 | 3/2002 | Zandveld et al. | |
| 6,385,676 B1 | 5/2002 | Adkisson | |
| 6,557,095 B1 | 4/2003 | Henstrom | |
| 6,711,672 B1 | 3/2004 | Agesen | |
| 6,779,092 B2 * | 8/2004 | Watts | G06F 13/1626 710/39 |
| 6,813,704 B1 | 11/2004 | Nguyen | |
| 6,851,011 B2 | 2/2005 | Lin | |
| 6,898,699 B2 | 5/2005 | Jourdan et al. | |
| 7,096,345 B1 * | 8/2006 | Chen | G06F 9/3838 712/217 |
| 7,113,510 B2 | 9/2006 | Lin | |
| 7,127,592 B2 | 10/2006 | Abraham et al. | |
| 7,170,814 B2 | 1/2007 | Morikawa | |
| 7,315,935 B1 | 1/2008 | Alsup et al. | |
| 7,373,637 B2 | 5/2008 | DeWitt, Jr. et al. | |
| 7,434,031 B1 | 10/2008 | Spracklen et al. | |
| 7,644,210 B1 | 1/2010 | Banning et al. | |
| 7,710,763 B2 | 5/2010 | Houston | |
| 7,716,460 B2 | 5/2010 | Stempel et al. | |
| 7,721,076 B2 | 5/2010 | Sodani et al. | |
| 7,783,869 B2 | 8/2010 | Grandou et al. | |
| 7,813,163 B2 | 10/2010 | Pille et al. | |
| 8,024,522 B1 | 9/2011 | Favor et al. | |
| 8,074,060 B2 | 12/2011 | Col et al. | |
| 8,219,784 B2 | 7/2012 | Ban et al. | |
| 8,238,192 B2 | 8/2012 | Nii | |
| 8,959,094 B2 | 2/2015 | Taylor | |
| 2002/0032852 A1 * | 3/2002 | Ramirez | G06F 9/3863 712/217 |
| 2003/0101444 A1 | 5/2003 | Wu et al. | |
| 2003/0163671 A1 | 8/2003 | Gschwind et al. | |
| 2004/0133766 A1 | 7/2004 | Abraham et al. | |
| 2006/0026408 A1 | 2/2006 | Morris et al. | |
| 2006/0242365 A1 | 10/2006 | Ali et al. | |
| 2007/0186081 A1 | 8/2007 | Chaudhry et al. | |
| 2007/0192541 A1 | 8/2007 | Balasubramonian et al. | |
| 2008/0028195 A1 | 1/2008 | Kissell et al. | |
| 2008/0126771 A1 | 5/2008 | Chen et al. | |
| 2008/0216073 A1 | 9/2008 | Yates et al. | |
| 2009/0019261 A1 | 1/2009 | Nguyen et al. | |
| 2009/0049279 A1 * | 2/2009 | Steiss | G06F 9/3851 712/215 |
| 2009/0103377 A1 | 4/2009 | Chang | |
| 2009/0164766 A1 | 6/2009 | Suggs et al. | |
| 2009/0182987 A1 | 7/2009 | Mejdrich et al. | |
| 2009/0210627 A1 | 8/2009 | Alexander et al. | |
| 2009/0254709 A1 | 10/2009 | Agesen | |
| 2010/0064287 A1 | 3/2010 | Bull et al. | |
| 2010/0097840 A1 | 4/2010 | Kim | |
| 2010/0131742 A1 | 5/2010 | Col et al. | |
| 2010/0153690 A1 | 6/2010 | Vick et al. | |
| 2010/0161948 A1 | 6/2010 | Abdallah | |
| 2011/0016292 A1 | 1/2011 | McDonald et al. | |
| 2011/0271055 A1 | 11/2011 | O'Connor | |
| 2011/0320784 A1 | 12/2011 | Almog et al. | |
| 2012/0117335 A1 | 5/2012 | Bryant | |
| 2012/0198157 A1 | 8/2012 | Abdallah | |
| 2012/0221747 A1 | 8/2012 | Mei et al. | |
| 2013/0086365 A1 | 4/2013 | Gschwind et al. | |
| 2014/0126278 A1 | 5/2014 | Nii et al. | |
| 2014/0281116 A1 | 9/2014 | Abdallah et al. | |
| 2014/0281388 A1 | 9/2014 | Abdallah | |
| 2014/0282546 A1 | 9/2014 | Abdallah et al. | |
| 2014/0282575 A1 | 9/2014 | Chan | |
| 2014/0304492 A1 | 10/2014 | Abdallah et al. | |
| 2015/0023086 A1 | 1/2015 | Wendell | |
| 2015/0324213 A1 | 11/2015 | Abdallah et al. | |

FOREIGN PATENT DOCUMENTS

| | | |
|---|---|---|
| TW | I368165 | 7/2012 |
| TW | I377502 | 11/2012 |
| WO | WO9737301 | 10/1997 |

OTHER PUBLICATIONS

Michael Slater, Microprocessor Report, The Insiders' Guide to Microprocessor Hardware, Oct. 1994, vol. 8.

* cited by examiner

METHOD AND APPARATUS FOR SORTING ELEMENTS IN HARDWARE STRUCTURES

CROSS REFERENCE TO RELATED APPLICATIONS

This application is a conversion of and claims priority to and the benefit of Provisional Patent Application No. 61/793,752, entitled "Method and Apparatus for Sorting Elements in Hardware Structures," having a filing Date of Mar. 15, 2013, which is herein incorporated by reference in its entirety.

FIELD OF THE INVENTION

Embodiments according to the present invention generally relate to microprocessor architecture and more particularly to the architecture for out-of-order microprocessors.

BACKGROUND OF THE INVENTION

In an Out-Of-Order ("OOO") microprocessor, instructions are allowed to issue out of their program order. However, in most cases, they are required to retire from the machine in order. Further, memory operations in the machine, regardless of the issue order, need to acquire and update memory status in program order. These diverging ordering behaviors give rise to problems at several locations in a micro-architecture. For example, in most OOO micro-architectures, allocating into queues, e.g., the load-store queue (LSQ), cannot be performed based on element arrival, which would be more computationally efficient, because the elements need to be removed in order.

As a result, complexity is often added to the machine, because element tagging and allocation needs to take place in all resources at the time of element allocation, e.g., the instruction allocation buffer also known as the "re-order buffer" ("ROB") needs to perform tagging and allocation of resources at the time of instruction allocation.

For example, FIG. 1 illustrates a pipeline for a conventional OOO microprocessor. Instructions are fetched at the fetch stage 102 and placed in the instruction fetch queue (IFQ) (not shown) within fetch stage 102. The instructions are generally the original assembly instructions found in the executable program. These instructions reference the architectural registers which are stored in register file 110. If the first fetched instruction was to be interrupted or raise an exception, the architectural register file 110 stores the results of all instructions until that point. Stated differently, the architectural register file stores the state that needs to be saved and restored in order to return back to the program during debugging or otherwise.

In an OOO microprocessor, the instructions execute out of order while still preserving data dependence constraints. Because instructions may finish in an arbitrary order, the architectural register file 110 cannot be modified by the instructions as they finish because it would make it difficult to restore their values accurately in the event of an exception or an interrupt. Hence, every instruction that enters the pipeline is provided a temporary register where it can save its result. The temporary registers are eventually written into the architectural register file in program order. Thus, even though instructions are being executed out of order, the contents of the architectural register files change as though they were being executed in program order.

The ROB 108 facilitates this process. After the instructions are dispatched from the fetch unit 102, they are decoded by decode module 104 and are placed in the ROB 108 and issue queue 106 (IQ). The ROB 108 and IQ 106 may be part of a scheduler module 172. As instructions are issued out of IQ 106 out of order, they are executed by execute module 112.

The write back module 114, in a conventional OOO micro-architecture will write the resulting values from those instructions back to the temporary registers in ROB 108 first. The ROB 108 keeps track of the program order in which instructions entered the pipeline and for each of these instructions, the ROB maintains temporary register storage. When the oldest instructions in the ROB produce a valid result, those instructions can be safely "committed." That is, the results of those instructions can be made permanent since there is no earlier instruction that can raise a mispredict or exception that may undo the effect of those instructions. When instructions are ready to be committed, the ROB 108 will move the corresponding values in the temporary registers for those instructions to the architectural register file 110. Therefore, through the ROB's in-order commit process, the results in the register file 110 are made permanent and architecturally visible.

By using the ROB 108 module as an intermediary between the write back module 114 and the register file 110, a delay at the commit stage is introduced by conventional OOO processors. Further, in order for the ROB 108 module to be able to move the values of the temporary registers to the register file 110 quickly during the commit cycle, the ROB needs to be placed in relatively close proximity to the register file 110, thereby, introducing an additional constraint on the design of the OOO architecture.

The instructions issued out of order from the IQ 106 may also comprise loads and stores. A load instruction uses registers in the register file 110 to compute an effective address and, subsequently, brings the data from that address in memory 118 into a register in register file 110. The store similarly uses registers in the register file 110 to compute an effective address, then transfers data from a register into that address in memory 118. Hence, loads and stores must first wait for register dependencies to be resolved in order to compute their respective effective address. Accordingly, each store instruction is queued in a load/store queue (LSQ) 116 while it is waiting for a register value to be produced—when it receives the broadcast regarding its availability, the effective address computation part of the store is issued.

Additionally, store instructions are queued in a LSQ because when stores are issued out of order from the IQ 106, there are memory dependencies between loads and the store instructions that need to be resolved before they can access memory 118. For example, a load can access the memory only after it is confirmed there are no prior stores that refer to the same address. It is, once again, the ROB 108 that is used to keep track of the various dependencies between the stores and the loads.

The scheduler 172 can also comprise an index array 140 that the ROB 108 communicates with in order to track the various dependencies. The index array 140 is used to store tags that the ROB 108 assigns to all load and store instructions that are dispatched from IQ 106. These tags are used to designate slots in the LSQ 116 for the store instructions, so that the instructions can be allocated in the LSQ 116 in program order. This, in turn, allows memory 118 to be accessed by the store instructions in program order. As a result, in conventional OOO processors, additional storage can be required for an index array 140 that stores tags for the respective locations of store instructions in the LSQ. Further, additional communication overhead is required to tag all store instructions, to convey the tags along with the store instructions to the LSQ, and to communicate to the LSQ to add the store instructions to the locations designated by the respective tags.

BRIEF SUMMARY OF THE INVENTION

Accordingly, a need exists for a method and apparatus for a more efficient and flexible OOO processor architecture, whereby, elements can be entered unordered into the various structures, e.g., the LSQ, register file, etc. at allocation time instead of expending the memory and computational resources up front to order the elements. To avoid the complexity of ordering elements at allocation time, this disclosure proposes an efficient and flexible implementation of element ordering from an unordered set at retirement time.

In one embodiment, the method and apparatus of the present invention enable elements in an OOO microprocessor to be ordered at the time of instruction retirement as compared to at the time of allocation for conventional OOO micro-architectures. By ordering elements at the time of instruction retirement, the re-order buffer is prevented from dedicating computational resources up-front at allocation time for ordering the elements. For example, allowing the write-back module to write values produced from instruction execution directly into the register file frees the ROB up from acting as an intermediary between the write-back module and the register file during the commit stage as described above. Additionally, it obviates the constraint of placing the ROB in close proximity with the register file.

Further, allowing elements to be allocated unordered into the open slots of the structures, e.g., the LSQ, the register file, etc. also frees up memory resources in the scheduler and in the pipeline generally. For example, the ROB is no longer required to track tags with an index array for entering stores into the LSQ in program order during instruction allocation. Additionally, the ROB does not need to allocate temporary register space for committing elements into the register file in order.

In one embodiment, a method for sorting elements in hardware structures is disclosed. The method comprises selecting a plurality of elements to order from an unordered input queue (UIQ) within a predetermined range in response to finding a match between at least one most significant bit of the predetermined range and corresponding bits of a respective identifier associated with each of the plurality of elements. The method further comprises presenting each of the plurality of elements to a respective multiplexer. Further the method comprises generating a select signal for an enabled multiplexer in response to finding a match between at least one least significant bit of a respective identifier associated with each of the plurality of elements and a port number of the ordered queue. Finally, the method comprises forwarding a packet associated with a selected element identifier to a matching port number of the ordered queue from the enabled multiplexer.

In another embodiment, a processor unit that is configured to perform a method for sorting elements in hardware structures is disclosed. The method comprises selecting a plurality of elements to order from an unordered input queue (UIQ) within a predetermined range in response to finding a match between at least one most significant bit of the predetermined range and corresponding bits of a respective identifier associated with each of the plurality of elements. The method further comprises presenting each of the plurality of elements to a respective multiplexer. Further the method comprises generating a select signal for an enabled multiplexer in response to finding a match between at least one least significant bit of a respective identifier associated with each of the plurality of elements and a port number of the ordered queue. Finally, the method comprises forwarding a packet associated with a selected element identifier to a matching port number of the ordered queue from the enabled multiplexer.

In a different embodiment, an apparatus for sorting elements in hardware structures is disclosed. The apparatus comprises a memory, a processor communicatively coupled to the memory, wherein the processor is configured to process instructions out of order, and further wherein the processor is configured to: (a) select a plurality of elements to order from an unordered input queue (UIQ) within a predetermined range in response to finding a match between at least one most significant bit of the predetermined range and corresponding bits of a respective identifier associated with each of the plurality of elements, wherein the UIQ comprises a plurality of out of order elements; (b) present each of the plurality of elements to a respective multiplexer; (c) generate a select signal for an enabled multiplexer associated with each element in response to finding a match between at least one least significant bit of a respective identifier associated with each of the plurality of elements and a port number of the ordered queue; and (d) forward a packet associated with a selected element identifier to a matching port number of the ordered queue from the enabled multiplexer.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
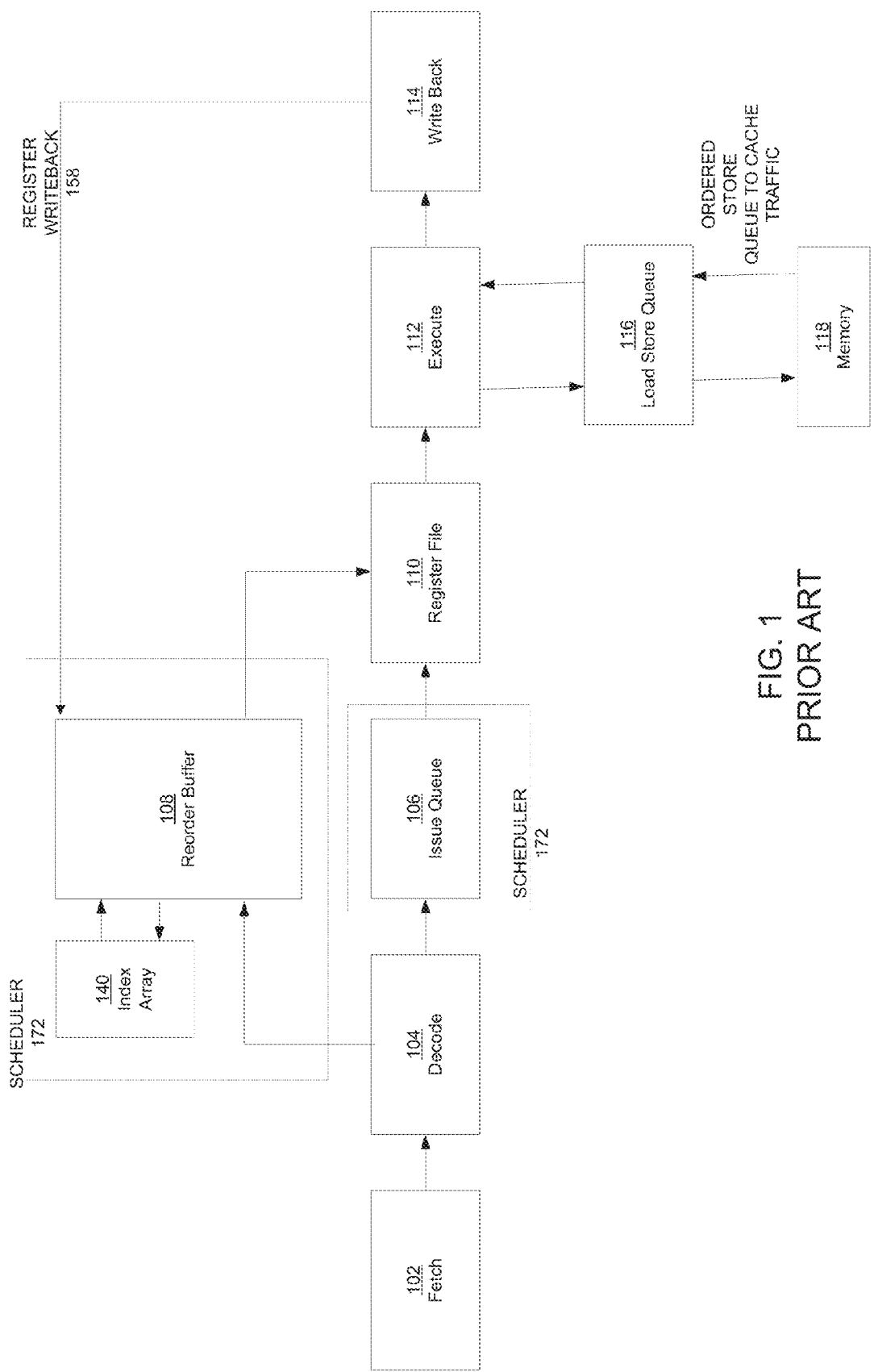
FIG. 1 is an exemplary diagram of a pipeline for a conventional out of order microprocessor.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Notation And Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "entering," "selecting," "gating," "presenting," "sorting," "allocating," "associating," "determining," "identifying," "caching," "reading," "writing," or the like, refer to actions and processes (e.g., flowchart 600 of FIG. 6) of a computer system or similar electronic computing device or processor (e.g., system 210 of FIG. 2). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Figure 2:
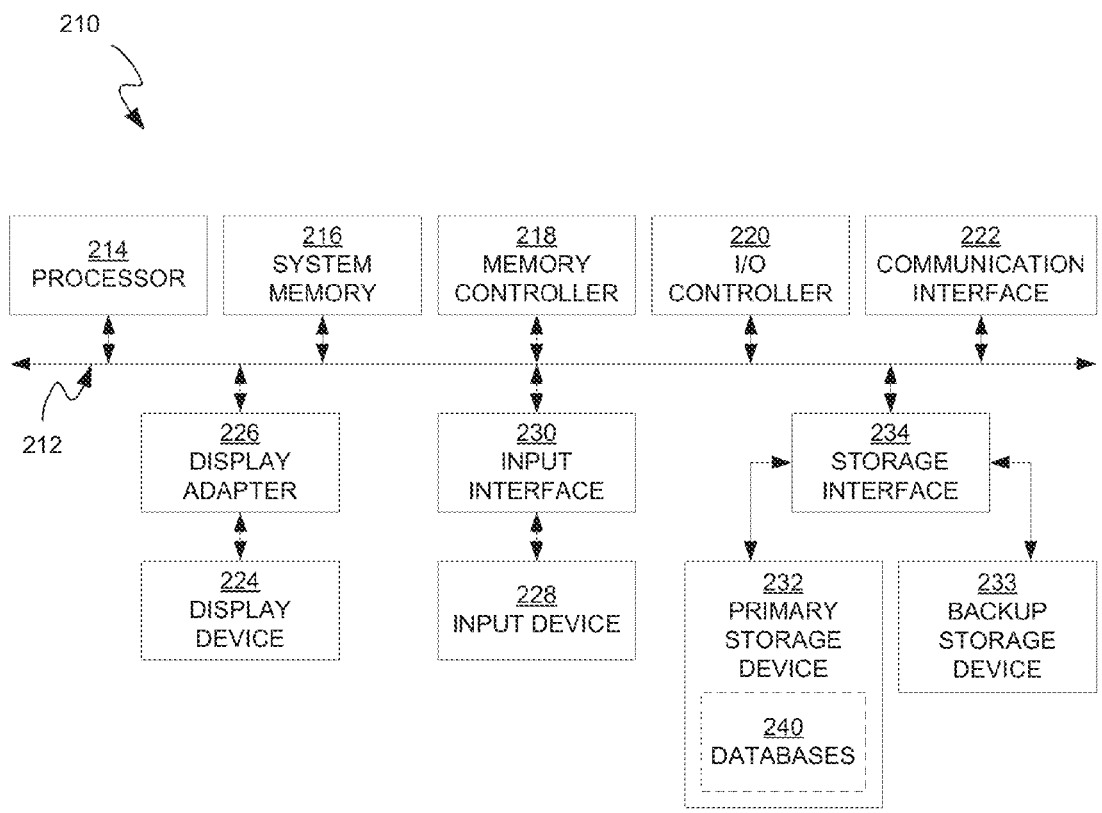
FIG. 2 is an exemplary computer system in accordance with embodiments of the present invention.

FIG. 2 is a block diagram of an example of a computing system 210 capable of being integrated with a processor 214 of an embodiment of the present disclosure. Computing system 210 broadly represents any single or multi-processor computing device or system capable of executing computer-readable instructions. Examples of computing system 210 include, without limitation, workstations, laptops, client-side terminals, servers, distributed computing systems, handheld devices, or any other computing system or device. In its most basic configuration, computing system 210 may include at least one processor 214 of an embodiment of the present invention and a system memory 216.

Processor 214 incorporates embodiments of the present invention and generally represents any type or form of processing unit capable of processing data or interpreting and executing instructions. In certain embodiments, processor 214 may receive instructions from a software application or module. These instructions may cause processor 214 to perform the functions of one or more of the example embodiments described and/or illustrated herein. In one embodiment, processor 214 may be an out of order microprocessor. In a different embodiment, processor 214 may be a superscalar processor. In yet another embodiment, processor 214 may comprise multiple processors operating in parallel.

System memory 216 generally represents any type or form of volatile or non-volatile storage device or medium capable of storing data and/or other computer-readable instructions. Examples of system memory 216 include, without limitation, RAM, ROM, flash memory, or any other suitable memory device. Although not required, in certain embodiments computing system 210 may include both a volatile memory unit (such as, for example, system memory 216) and a non-volatile storage device (such as, for example, primary storage device 232).

Computing system 210 may also include one or more components or elements in addition to processor 214 and system memory 216. For example, in the embodiment of FIG. 2, computing system 210 includes a memory controller 218, an input/output (I/O) controller 220, and a communication interface 222, each of which may be interconnected via a communication infrastructure 212. Communication infrastructure 212 generally represents any type or form of infrastructure capable of facilitating communication between one or more components of a computing device. Examples of communication infrastructure 212 include, without limitation, a communication bus (such as an Industry Standard Architecture (ISA), Peripheral Component Interconnect (PCI), PCI Express (PCIe), or similar bus) and a network.

Memory controller 218 generally represents any type or form of device capable of handling memory or data or controlling communication between one or more components of computing system 210. For example, memory controller 218 may control communication between processor 214, system memory 216, and I/O controller 220 via communication infrastructure 212.

I/O controller 220 generally represents any type or form of module capable of coordinating and/or controlling the input and output functions of a computing device. For example, I/O controller 220 may control or facilitate transfer of data between one or more elements of computing system 210, such as processor 214, system memory 216, communication interface 222, display adapter 226, input interface 230, and storage interface 234.

Communication interface 222 broadly represents any type or form of communication device or adapter capable of facilitating communication between example computing system 210 and one or more additional devices. For example, communication interface 222 may facilitate communication between computing system 210 and a private or public network including additional computing systems. Examples of communication interface 222 include, without limitation, a wired network interface (such as a network interface card), a wireless network interface (such as a wireless network interface card), a modem, and any other suitable interface. In one embodiment, communication interface 222 provides a direct connection to a remote server via a direct link to a network, such as the Internet. Communication interface 222 may also indirectly provide such a connection through any other suitable connection.

Communication interface 222 may also represent a host adapter configured to facilitate communication between computing system 210 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 222 may also allow computing system 210 to engage in distributed or remote computing. For example, communication interface 222 may receive instructions from a remote device or send instructions to a remote device for execution.

As illustrated in FIG. 2, computing system 210 may also include at least one display device 224 coupled to communication infrastructure 212 via a display adapter 226. Display device 224 generally represents any type or form of device capable of visually displaying information forwarded by display adapter 226. Similarly, display adapter 226 generally represents any type or form of device configured to forward graphics, text, and other data for display on display device 224.

As illustrated in FIG. 2, computing system 210 may also include at least one input device 228 coupled to communication infrastructure 212 via an input interface 230. Input device 228 generally represents any type or form of input device capable of providing input, either computer- or human-generated, to computing system 210. Examples of input device 228 include, without limitation, a keyboard, a pointing device, a speech recognition device, or any other input device.

As illustrated in FIG. 2, computing system 210 may also include a primary storage device 232 and a backup storage device 233 coupled to communication infrastructure 212 via a storage interface 234. Storage devices 232 and 233 generally represent any type or form of storage device or medium capable of storing data and/or other computer-readable instructions. For example, storage devices 232 and 233 may be a magnetic disk drive (e.g., a so-called hard drive), a floppy disk drive, a magnetic tape drive, an optical disk drive, a flash drive, or the like. Storage interface 234 generally represents any type or form of interface or device for transferring data between storage devices 232 and 233 and other components of computing system 210.

In one example, databases 240 may be stored in primary storage device 232. Databases 240 may represent portions of a single database or computing device or it may represent multiple databases or computing devices. For example, databases 240 may represent (be stored on) a portion of computing system 210. Alternatively, databases 240 may represent (be stored on) one or more physically separate devices capable of being accessed by a computing device, such as computing system 210.

Continuing with reference to FIG. 2, storage devices 232 and 233 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 232 and 233 may also include other similar structures or devices for allowing computer software, data, or other computer-readable instructions to be loaded into computing system 210. For example, storage devices 232 and 233 may be configured to read and write software, data, or other computer-readable information. Storage devices 232 and 233 may also be a part of computing system 210 or may be separate devices accessed through other interface systems.

Many other devices or subsystems may be connected to computing system 210. Conversely, all of the components and devices illustrated in FIG. 2 need not be present to practice the embodiments described herein. The devices and subsystems referenced above may also be interconnected in different ways from that shown in FIG. 2. Computing system 210 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 210. All or a portion of the computer program stored on the computer-readable medium may then be stored in system memory 216 and/or various portions of storage devices 232 and 233. When executed by processor 214, a computer program loaded into computing system 210 may cause processor 214 to perform and/or be a means for performing the functions of the example embodiments described and/or illustrated herein. Additionally or alternatively, the example embodiments described and/or illustrated herein may be implemented in firmware and/or hardware.

Method and Apparatus for Sorting Elements in Hardware Structures

Embodiments of the present invention provide methods and systems for a more efficient and flexible OOO processor architecture, whereby, elements can be entered unordered into the various structures in a processor pipeline, e.g., the LSQ, register file, etc. at allocation time instead of expending the memory and computational resources up front to order the elements. To avoid the complexity of ordering elements at allocation time, this disclosure proposes an efficient and flexible implementation of element ordering from an unordered set.

In one embodiment, the method and apparatus of the present invention enable elements in an OOO microprocessor to be ordered at the time of instruction retirement as compared to at the time of allocation for conventional OOO micro-architectures. By ordering elements at the time of instruction retirement, the re-order buffer is prevented from dedicating computational resources up-front at allocation time for ordering the instruction elements.

For example, allowing the write-back module to write values produced from instruction execution directly into the register file frees up the ROB from acting as an intermediary between the write-back module and the register file during the commit stage. Accordingly, the write-back module can write the values of executed instructions directly in the register file. As a result, the present invention obviates the constraint of placing the ROB in close proximity with the register file. Because the write back module writes directly to the register file, the proximity of the ROB and register file is no longer required to enable a rapid transfer of ordered elements from the ROB to the register file.

Further, the ROB is prevented from dedicating resources for tagging and maintaining an ordering scheme for the stores in the LSQ, which can be computationally expensive to implement.

Additionally, allowing elements to be allocated unordered into the open slots of the structures, e.g., the LSQ, the register file, etc. also frees up memory resources in the scheduler and the pipeline in general. For example, the ROB is no longer required to track tags with an index array for entering stores into the LSQ in program order during instruction allocation. Additionally, the ROB does not need to allocate temporary register space for committing elements into the register file in order.

Figure 3:
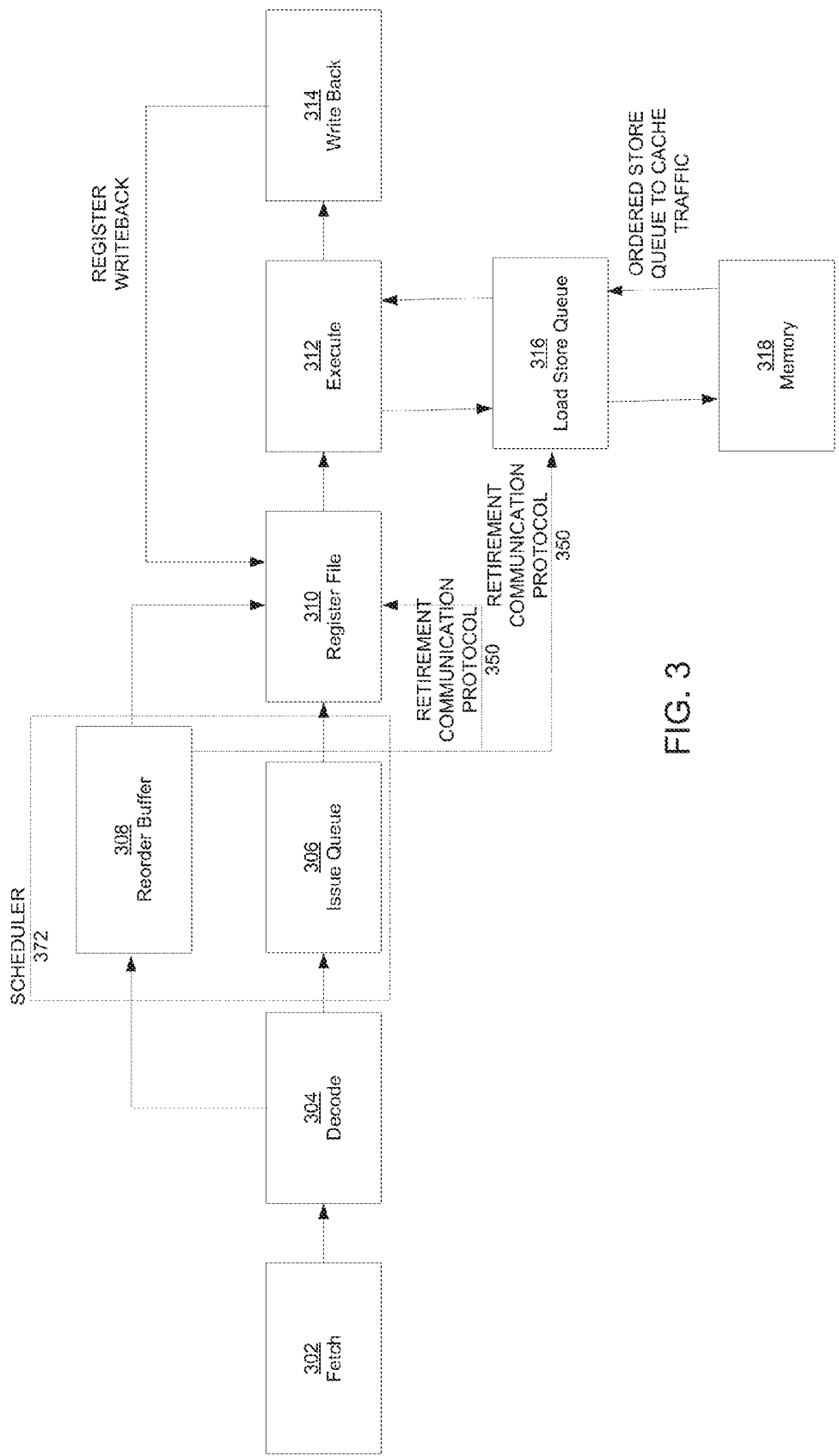
FIG. 3 is an exemplary diagram of a pipeline for an out of order microprocessor in which elements are ordered at instruction retirement time in accordance with embodiments of the present invention.

FIG. 3 is an exemplary diagram of a pipeline for an out of order microprocessor in which elements are ordered at instruction retirement time in accordance with embodiments of the present invention. FIG. 3 illustrates that in one embodiment of the present invention, the write back module 314 advantageously adds unordered elements it receives from the execution module 312 directly into the register file 310 instead of adding them to the ROB 308. In addition FIG. 3 illustrates that, in one embodiment of the present invention, the ROB 308 controls the ordering of the elements in register file 310 and LSQ 316 at retirement time through a retirement interface comprising retirement communication protocol 350 as will be explained further below.

As illustrated in FIG. 3, instructions are fetched at the fetch stage 302 and placed in the instruction fetch queue (IFQ) (not shown) within fetch stage 302. These instructions reference the architectural registers which are stored in register file 310. After the instructions are dispatched from the fetch unit 302, they are decoded by decode module 304 and are placed in the ROB 308 and issue queue 306 (IQ). In one embodiment of the present invention, the scheduler module 372 comprises the ROB 308 and IQ 306. In a different embodiment, the present invention comprises a scheduler module 372 that in itself acts as the re-order buffer. As instructions are issued out of IQ 306 out of order, they are executed by execute module 312.

The write back module 314, in one embodiment of the present invention, writes the values resulting from instruction execution directly into register file 310 without sorting them. This is advantageous, because no processing resources are expended upfront for sorting the elements before they are added to the register file.

Also, it obviates the need for register file 310 to be located in close physical proximity with the ROB 308 because, as compared with a conventional OOO processor, the ROB 308 does not need to perform a rapid transfer of ordered elements to the register file 308 during the commit cycle. Instead, the unordered elements are added in physical memory to the register file 310 in an unordered fashion and are then retired to the architectural files in order at the retirement stage. Also, by dissociating the register file 310 from the ROB 308, the register file 310 is now free to be located in close physical proximity to the generation of the register values, e.g., the write back module 314.

Further, when a store is issued out of IQ 306, it can be placed in the first available open slot in the LSQ 316 without regard for order. As compared with conventional OOO processors, where a store is entered into a dedicated slot in the LSQ associated with a respective tag assigned by the ROB 308, the present invention advantageously conserves both computational effort and time at allocation time.

The unordered elements in register file 310 and LSQ 316 are ordered using a retirement communication protocol 350 at instruction retirement time. The logic and circuitry for performing the retirement is stored in ROB 308. The retirement communication protocol 350 is part of the retirement interface between ROB 308 and both register file 310 and LSQ 316. The retirement communication protocol 350 can enable ordering of the elements in register file 310 and LSQ 316 before they are retired. The ordered elements in the register file 310 will then preserve and reflect an accurate state of the machine. Further, once the elements in LSQ 316 are ordered, the memory dependencies between them are resolved and the stores in LSQ 316 can access memory 318 safely. In one embodiment of the present invention, the retirement communication protocol 350 is only used to order elements in either one of the register file 310 or the LSQ 316 but not both.

Figure 4:
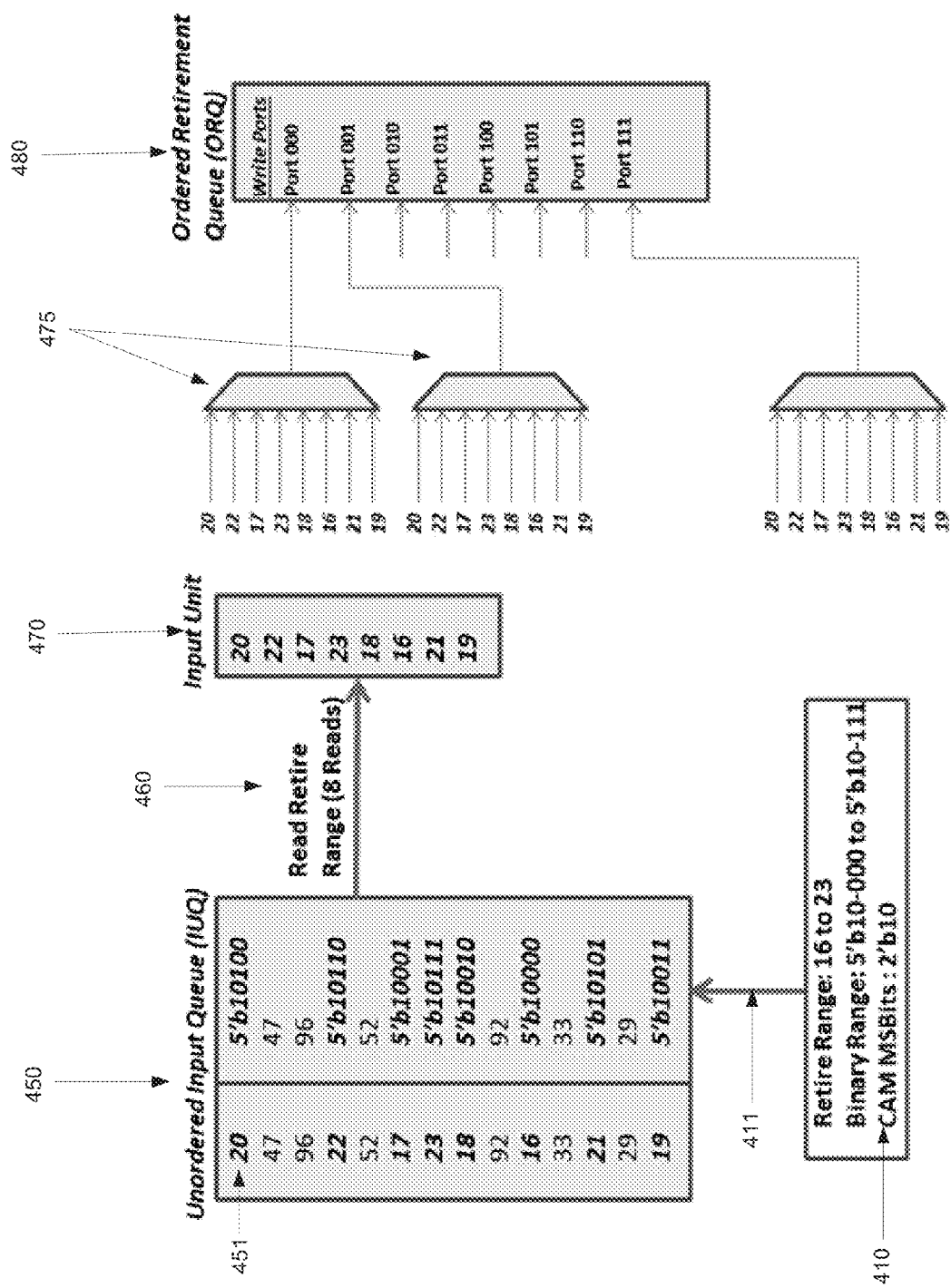
FIG. 4 is a block diagram illustrating an exemplary retirement cycle in which elements are selected for retirement from an unordered input queue in accordance with embodiments of the present invention.

FIG. 4 is a block diagram illustrating an exemplary retirement cycle in which elements are selected for retirement from an unordered input queue in accordance with embodiments of the present invention. In particular, FIG. 4 illustrates an exemplary retirement cycle wherein unordered elements within a predetermined retirement range specified by retirement communication protocol 350 are selected from unordered input queues so they can be inserted into an ordered retirement queue. These unordered input queues (UIQs) can either be within register file 310 or LSQ 316 or both. The selection process and retirement range are dictated by retirement communication protocol 350.

The unordered elements placed into register file 310 or LSQ 316 are, in one embodiment, inserted into UIQs 450 maintained within the respective register file 310 or LSQ 316 or both. Each of the elements entered into the unordered input queue is tagged with an identifier indicating the location of the element within the ROB 308. For example, element 451 in UIQ 450 was previously located in position 20 within ROB 308.

The elements in IUQ 450 are moved to an ordered retirement queue (ORQ) 480 during the retirement of the associated instructions. As explained above, this retirement process, in one embodiment, is used for potentially moving randomly allocated registers in physical memory within register file module 310 to their architectural locations, or to move stores from an unordered LSQ 316 to the cache memory 318 in order. In other embodiments, the retirement communication protocol 350 can be used to order and retire elements in any other hardware structure in the processor as well.

In one embodiment, the retirement communication protocol 350 considers the tagged identifiers for the elements in the UIQ 450 and confines the retirement procedure to take place in fixed ranges. Accordingly, the processor will retire elements in a fixed window before moving on to the next window of elements. The fixed range, in one embodiment, is variable and can be specific to the design. The retirement communication protocol 350 controls the retirement procedure, in one embodiment, by communicating the retirement range and the number of elements to be retired to the register file 310 and the LSQ 316.

For example, as ROB 308 commits elements, it can communicate via retirement communication protocol 350 to the register file 310 or LSQ 316 to: (a) a designated retirement range within which to retire elements and (b) the number of elements within that range to retire.

Accordingly, based on the retirement range specified by the retirement communication protocol 350, elements are selected from UIQ 450 for ordering using the most significant bits of the retirement range. The number of bits which will be required for the selection of the elements to be ordered will depend on the maximum number of elements that can be retired in a given cycle.

For example, if the size of an element identifier is given by $E_s$ and maximum elements allowed to retire in a cycle (retirement range) is given by N, the number of bits required to identify elements for a given retirement range specified by the retirement communication protocol 350 will be determined by the following equation:

$S=E_s-\log_2 N$, where S signifies the number of most significant bits of the retirement range, which will be common across all the identifiers for the elements within the IUQ 450 for that retirement range. In one embodiment, the retirement range will be a power of 2 in keeping with the binary organization of most elements in a microprocessor. As will be discussed in connection with FIG. 5 below, the remaining bits of the element identifier $E_s$ will be used to order the elements.

FIG. 4 illustrates an example of how elements can be selected to retire from the IUQ 450 and prepared for port assignment in an exemplary retirement cycle. The size of the element identifier in the example of FIG. 4 is 5 bits and the maximum retirement range is restricted to be 8 elements. The number of bits, S, required to identify and select the proper elements in the retirement range designated by retirement communication protocol 350 is therefore 2 ($5-\log_2 8$).

The IUQ 450 of FIG. 4 has 14 elements when the Retire Range read enable signal 411 is asserted. The range to be retired in the cycle illustrated in FIG. 4 is from 16 through 23, which is a range of 8 with the corresponding binary values shown in FIG. 4 within IUQ 450. The designated range to be retired will be communicated via the retirement communication protocol 350. Only the two most significant bits 410 ($5-\log_2 8$) of the element identifiers are used to perform the content address match (CAM) to read the proper range of elements using the Read Retire Range interface 460. The remaining three least significant bits of the element identifier are typically not relevant to the selection process. The 2 most significant bits 410 for all element identifiers in the range 16 through 23 in IUQ 450 are 2'b10. These 2 CAM most significant bits are used to determine the Retire Range read enable signal 411 to select the elements in the correct range. Using the Retire Range read enable signal 411, the elements are read out to the input unit 470 for port mapping and ordering as will be explained in connection with FIG. 5 below.

However, if for instance, the ROB 308 had committed 10 elements, ranging, for example, from 16 to 25, instead of 8 elements as described above, then two retirement cycles would be required to retire all the elements because the maximum retirement range is preset to 8 elements in the example illustrated in FIG. 4. In such a case the remaining two elements, 24 and 25, would be retired in a separate retirement cycle during which the Retire Range read enable signal 411 would need to read out elements that had (2'b11) as their 2 CAM most significant bits. However, only two elements, 24 and 25, would be retired in the second cycle. By fixing the retirement range to a power of 2, the present invention advantageously avoids having to perform an expensive "greater than" and "less than" computational operation to select elements within an arbitrary range that is not a power of 2. Instead, a simpler CAM match or XOR operation can be performed in accordance with an embodiment of the present invention to match elements with the retirement range selected by retirement communication protocol 250.

Figure 5:
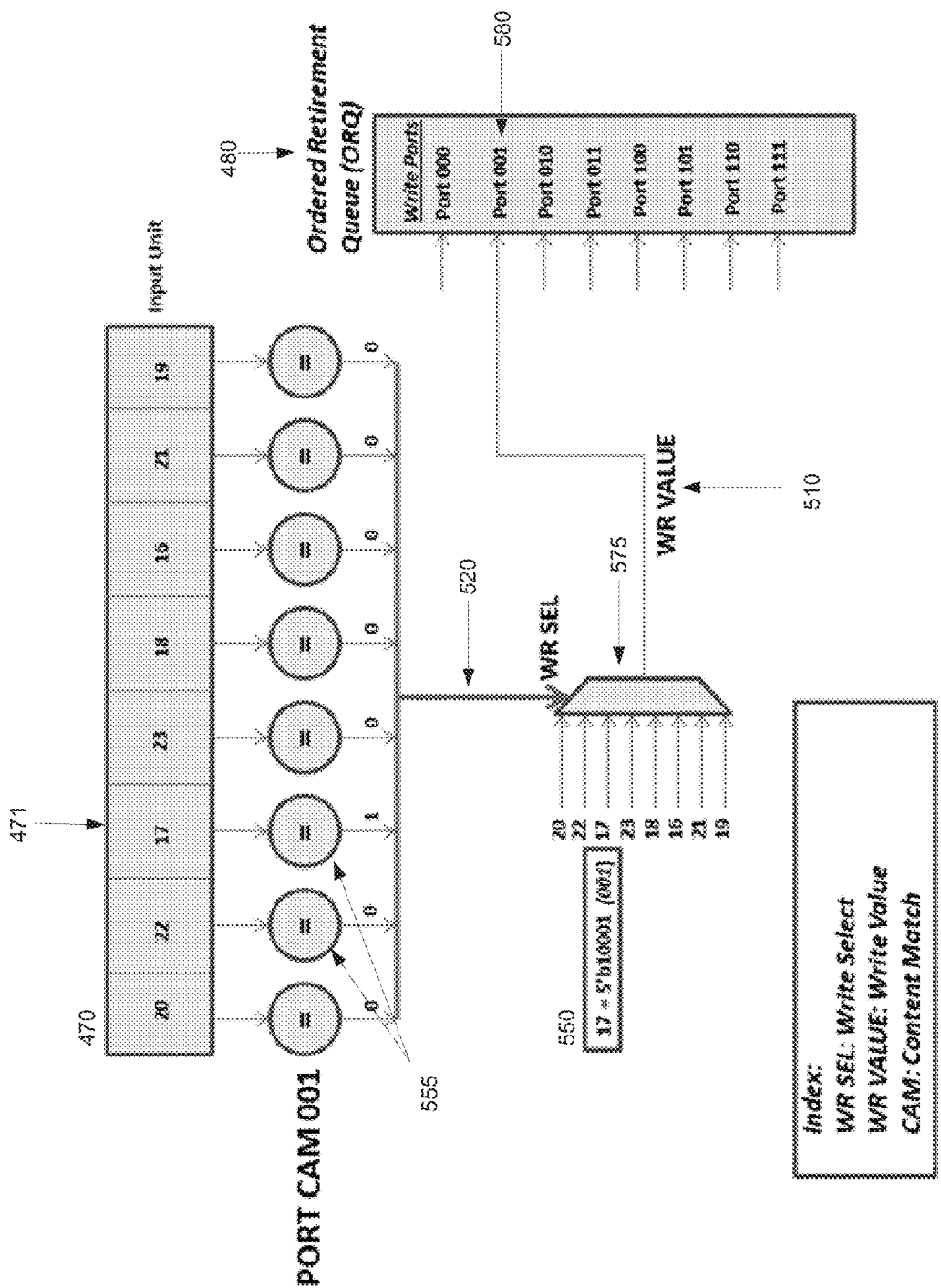
FIG. 5 is a block diagram illustrating an exemplary retirement cycle in which elements are sorted into an ordered retirement queue in accordance with embodiments of the present invention.

FIG. 5 is a block diagram illustrating an exemplary retirement cycle in which elements are sorted into an ordered retirement queue in accordance with embodiments of the present invention. In particular, FIG. 5 illustrates how ordering and port mapping takes place in the exemplary retirement cycle of FIG. 4, once the element selection has completed and the elements are read out to input unit 470. The retirement communication protocol 350 communicated from the ROB 308 will determine the number of elements that need to be ordered and port mapped. For example, if the retirement range in FIG. 4 is 16 to 23, and the ROB 308 has committed all 8 elements, then all 8 elements in input unit 470 will get ordered and port mapped.

As shown in FIG. 4, each element in input unit 470 is presented to a multiplexer 475 for each port of the ORQ 480. Each port of ORQ 480 has a multiplexer 475 gating its input. FIG. 5 illustrates the port mapping logic for Port 1 (3'b001) 580. This logic can be replicated for each port of the ORQ or any logic that finally holds ordered elements. First, the select signals for the multiplexers 475 are generated. To generate the encoded select signal (WR_SEL) 520 for the input multiplexer 575, the 3 least significant bits of the element identifiers in the input unit 470 are compared against the port number of each port using port CAM circuitry 555. If the port CAM circuitry indicates a match with the 3 least significant bits of an element identifier, e.g., element 17 in FIG. 5, a 1 hot encoded signal, WR SEL 520, for the input multiplexer for the port is created.

In the case illustrated in FIG. 5, the port being arbitrated for is Port 1 580. The element intended for Port 1 580 is input 550 into multiplexer 575, which corresponds with element 17. The 3 least significant bits of 17 are 3'b001. Since the select range is 16-23 (5'b10000-5'b11111), and the least 3 significant bits of 17 (5'b100001) match the port number (3'b001), the packet or value associated with element 17 is selected and mapped on signal WR VALUE 510 and subsequently mapped to Port 1 580. In one embodiment, the write enable for the respective port, e.g., Port 1, is generated by performing a logical OR of the WR SEL signal 520.

As discussed above, the retirement communication protocol 350 dictates how many elements in the input unit 470 are to be retired in a given cycle. Accordingly, all elements in input unit 470 that are to be retired within the retirement range 16-23 will also be retired in the same cycle as element 17 for the example shown in FIGS. 4 and 5. As with element 17, the 3 least significant bits of the identifiers will be used to order and port map the elements within the selected range window (16-23). However, it is not necessary for the input unit 470 or ORQ 480 to be full when the elements are retired, e.g., less than the full set of 8 elements can also be retired in any particular cycle in the example shown in FIGS. 4 and 5. The retirement communication protocol 350 will typically dictate how many elements are to be retired.

At the end of the retirement process then, the ORQ 480 will have an ordered list of elements. In the case of the selecting and sorting circuitry of the present invention being applied to order stores from an unordered LSQ, the circuitry ensures that the ORQ 480 will retire the stores to memory in program order. The same will apply to the case of writing unordered registers in register file 310 back to the architectural register file.

Figure 6:
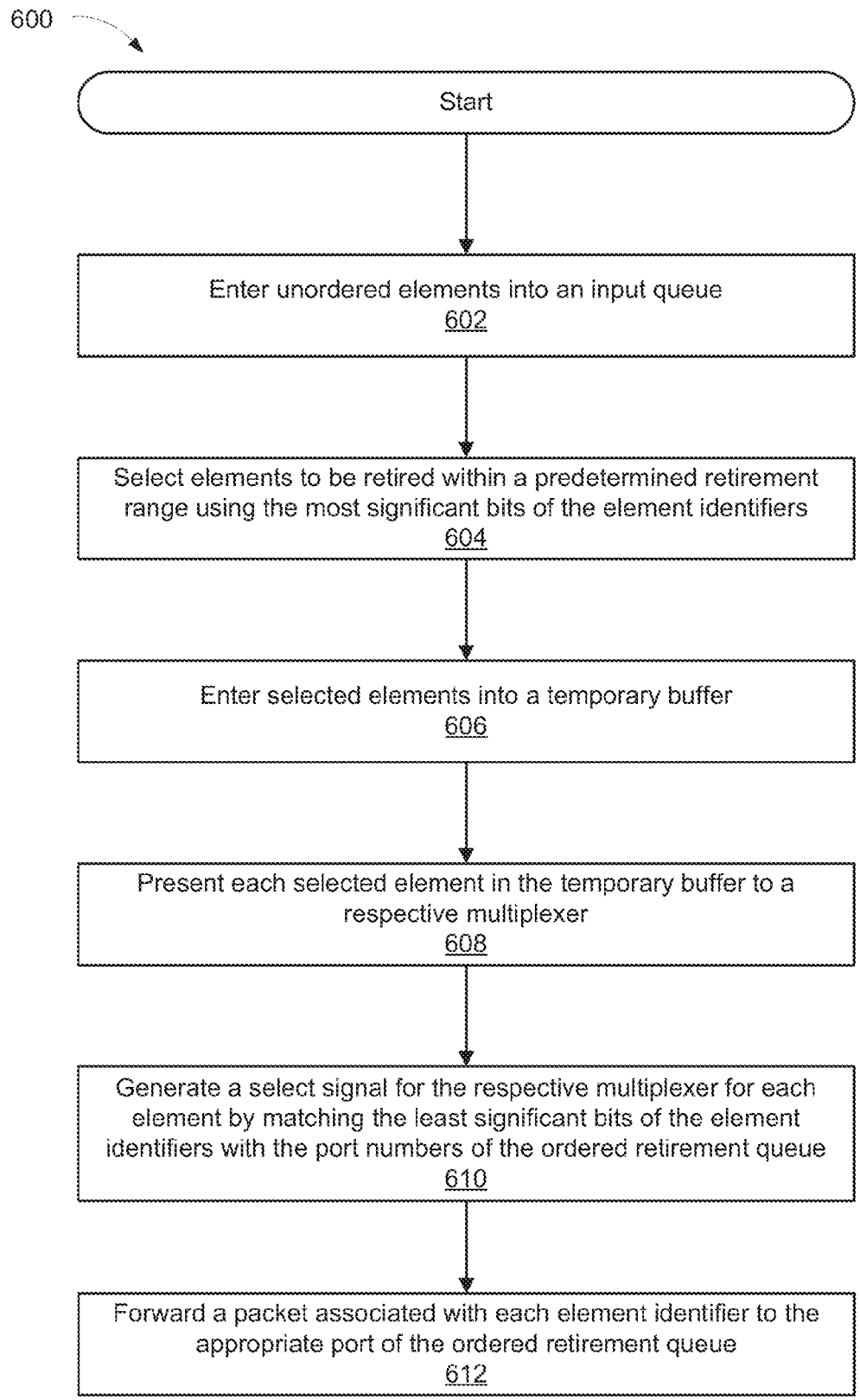
FIG. 6 depicts a flowchart for an exemplary computer controlled process for selecting and sorting elements into an ordered retirement queue in an out of order micro-architecture in accordance with embodiments of the present invention.

FIG. 6 depicts a flowchart for an exemplary computer controlled process for selecting and sorting elements into an ordered retirement queue in an out of order micro-architecture in accordance with embodiments of the present invention. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 6 should not be construed as limiting the scope of the invention. Rather, it will be apparent to persons skilled in the relevant art(s) from the teachings provided herein that other functional flows are within the scope and spirit of the present invention. Flowchart 600 may be described with continued reference to exemplary embodiments described above, though the method is not limited to those embodiments At step 602, unordered elements are entered into an UIQ 450. As explained above, either the register file 310 or LSQ 316 or both comprise a respective UIQ for holding unordered elements before they are ordered in preparation for retirement.

At step 604, elements from the UIQ 450 are selected for retirement based on the retirement range specified by retirement communication protocol 350 and the associated element identifiers. The retirement range, in one embodiment, is a power of 2, which allows the most significant bits of the elements to be used for selecting the elements by performing a CAM match.

The selected elements at step 606 are entered into a temporary buffer, illustrated in FIGS. 4 and 5 as input unit 470 before they are sorted and port mapped into an ordered retirement queue.

At step 608, each element within input unit 470 is presented to a multiplexer 475. Each multiplexer 475 gates the input to each of the ORQ 480 ports.

At step 610, the least significant bits of the element identifiers can be used to generate a WR SEL 520 enable signal to map the element to the appropriate port of ORQ 480 via a WR VALUE 510 signal. The least significant bits of the identifier are matched with the port numbers by using CAM circuitry 555 and generating the WR SEL 520 enable signal for the input multiplexer to the port in response to finding a match. As explained above, each port of ORQ 480 is gated by a respective multiplexer that is enabled by a WR SEL signal and outputs a WR VALUE signal with the element packet for the respective port.

Finally, at step 612, element packets associated with the selected element identifiers can be transferred to the appropriate ports on ORQ 480 through the enabled multiplexers. The ORQ 480 now comprises an ordered set of elements and can be retired in program order.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method for sorting elements in hardware structures, said method comprising:
  selecting a plurality of elements to order from an unordered input queue (UIQ) within a range in response to finding a match between at least one most significant bit of said range and corresponding bits of a respective identifier operable to tag each of said plurality of elements, wherein said UIQ comprises a plurality of out of order elements;

presenting each of said plurality of elements to a respective multiplexer; and generating a select signal for an enabled multiplexer corresponding to each element in said plurality of elements in response to finding a match between at least one least significant bit of a respective identifier operable to tag each of said plurality of elements and a port number of an ordered retirement queue.

2. The method of claim 1, further comprising:
forwarding a packet corresponding to a selected element identifier to a matching port number of said ordered queue from said enabled multiplexer.

3. The method of claim 2, further comprising:
generating a write enable for said matching port number by performing a logical OR operation of said select signal; and
writing said packet into said matching port number of said ordered queue.

4. The method of claim 2, wherein said UIQ is disposed in a module of a pipeline for an out of order microprocessor, wherein said module is selected from a group consisting of: a register file and a load-store queue.

5. The method of claim 4, wherein said selecting and said generating are performed in response to a communication protocol controlled by a reorder buffer in said pipeline.

6. The method of claim 5, wherein said communication protocol communicates said range and a number of elements to be ordered to said module.

7. The method of claim 6, wherein said ordered queue comprises elements to be retired from said module in a retirement cycle of said pipeline.

8. The method of claim 5, wherein a respective identifier for each of said plurality of elements corresponds to a location in said reorder buffer wherein said plurality of elements are stored prior to being entered into said UIQ.

9. The method of claim 4, wherein said plurality of elements are entered into said UIQ of said register file from a write back module of said pipeline.

10. The method of claim 4, wherein said plurality of elements are entered into said UIQ of said register file from a reorder buffer in said pipeline.

11. A processor unit configured to perform a method for sorting elements in hardware structures, said method comprising:

selecting a plurality of elements to order from an unordered input queue (UIQ) within a range in response to finding a match between at least one most significant bit of said range and corresponding bits of a respective identifier operable to tag each of said plurality of elements, wherein said UIQ comprises a plurality of out of order elements;

presenting each of said plurality of elements to a respective multiplexer; and generating a select signal for an enabled multiplexer corresponding to each element in said plurality of elements in response to finding a match between at least one least significant bit of a respective identifier operable to tag each of said plurality of elements and a port number of an ordered retirement queue.

12. The process unit as described in claim 11, wherein said method further comprises:
forwarding a packet corresponding to a selected element identifier to a matching port number of said ordered queue from said enabled multiplexer.

13. The processor unit as described in claim 12, wherein said method further comprises:
generating a write enable for said matching port number by performing a logical OR operation of said select signal; and
writing said packet into said matching port number of said ordered queue.

14. The processor unit as described in claim 12, wherein said processor unit is an out of order microprocessor and wherein said UIQ is maintained in a module of a pipeline for said out of order microprocessor, wherein said module is selected from a group consisting of: a register file and a load-store queue.

15. The processor unit as described in claim 14, wherein said selecting and said generating are performed in response to a communication protocol controlled by a reorder buffer in said pipeline.

16. The processor unit as described in claim 15, wherein said communication protocol communicates said range and a number of elements to be ordered to said module.

17. The processor unit as described in claim 16, wherein said ordered queue comprises elements to be retired from said module in a retirement cycle of said pipeline.

18. The processor unit as described in claim 15, wherein a respective identifier for each of said plurality of elements corresponds to a location in said reorder buffer wherein said plurality of elements are stored prior to being entered into said UIQ.

19. The processor unit as described in claim 14, wherein said plurality of elements are entered into said UIQ of said register file from a write back module of said pipeline.

20. The processor unit as described in claim 14, wherein said plurality of elements are entered into said UIQ of said register file from a reorder buffer in said pipeline.

21. An apparatus for sorting elements in hardware structures, said apparatus comprising:
a memory;
a processor communicatively coupled to said memory, wherein said processor is configured to process instructions out of order, and further wherein said processor is configured to:
select a plurality of elements to order from an unordered input queue (UIQ) within a range in response to finding a match between at least one most significant bit of said range and corresponding bits of a respective identifier operable to tag each of said plurality of elements, wherein said UIQ comprises a plurality of out of order elements;
present each of said plurality of elements to a respective multiplexer; and
generate a select signal for an enabled multiplexer corresponding to each element in said plurality of elements in response to finding a match between at least one least significant bit of a respective identifier operable to tag each of said plurality of elements and a port number of an ordered retirement queue.

22. The apparatus of claim 21, wherein the processor is further configured to:
forward a packet corresponding to a selected element identifier to a matching port number of said ordered queue from said enabled multiplexer.

23. The apparatus of claim 22, wherein said processor is further configured to:
generate a write enable for said matching port number by performing a logical OR operation of said select signal; and write said packet into said matching port number of said ordered queue.

24. The apparatus of claim 22, wherein said plurality of elements correspond with said instructions processed out of order by said processor.

\* \* \* \* \*